United States Patent
Kalele et al.

(10) Patent No.: US 12,093,695 B2
(45) Date of Patent: Sep. 17, 2024

(54) METHOD AND SYSTEM TO PROCESS ASYNCHRONOUS AND DISTRIBUTED TRAINING TASKS

(71) Applicant: Tata Consultancy Services Limited, Mumbai (IN)

(72) Inventors: Amit Kalele, Pune (IN); Ravindran Subbiah, Thiruvananthapuram (IN); Anubhav Jain, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 2 days.

(21) Appl. No.: 18/172,702

(22) Filed: Feb. 22, 2023

(65) Prior Publication Data

US 2023/0297388 A1    Sep. 21, 2023

(30) Foreign Application Priority Data

Mar. 17, 2022   (IN) .............................. 202221014863

(51) Int. Cl.
*G06F 9/48*   (2006.01)
*G06F 9/38*   (2018.01)
*G06N 3/063*  (2023.01)

(52) U.S. Cl.
CPC .......... *G06F 9/3871* (2013.01); *G06F 9/3877* (2013.01); *G06F 9/4881* (2013.01); *G06N 3/063* (2013.01)

(58) Field of Classification Search
CPC ...... G06F 9/4881; G06F 9/3877; G06N 3/063
See application file for complete search history.

(56) References Cited

U.S. PATENT DOCUMENTS

| | | | |
|---|---|---|---|
| 10,846,096 B1* | 11/2020 | Chung ................... | G06F 9/3856 |
| 2016/0021636 A1* | 1/2016 | Krallman ............... | H04W 64/00 |
| | | | 455/456.1 |
| 2019/0311257 A1* | 10/2019 | Chang ..................... | G06N 3/04 |
| 2020/0089534 A1* | 3/2020 | Chen ....................... | G06N 5/01 |

(Continued)

OTHER PUBLICATIONS

Hedge, Vishakh et al., "Parallel and distributed deep learning", Computer Science, Date: 2021 Publisher: Stanford University, https://web.stanford.ed/~rezab/classes/cme323/S16/projects_reports/hedge_usmani.pdf.

(Continued)

*Primary Examiner* — Jacob Petranek
(74) *Attorney, Agent, or Firm* — FINNEGAN, HENDERSON, FARABOW, GARRETT & DUNNER LLP

(57) ABSTRACT

This disclosure relates generally relates to method and system to process asynchronous and distributed training tasks. Training a large-scale deep neural network (DNN) model with large-scale training data is time-consuming. The method creates a work queue (Q) with a set of predefined number of tasks comprising a training data. Here, set of central processing units (CPUs) information and a set of graphics processing units (GPUs) information are fetched from the current environment to initiate a parallel process asynchronously on the work queue (Q) to train a set of deep learning models with optimized resources using a data pre-processing technique, to compute a transformed training data and training by using an asynchronous model training technique, the set of deep learning models on each GPU asynchronously with the transformed training data based on a set of asynchronous model parameters.

9 Claims, 8 Drawing Sheets

(56) References Cited

U.S. PATENT DOCUMENTS

2020/0089535 A1* 3/2020 Du .......................... G06N 5/01
2021/0216875 A1   7/2021 Ltd
2022/0301301 A1* 9/2022 Marciano, Jr. ........ G06F 18/217
2022/0333940 A1* 10/2022 Ali ..................... G01C 21/3469

OTHER PUBLICATIONS

Huang, Sheng-Jun et al., "Asynchronous Active Learning with Distributed Label Querying", Computer Science, Date: 2021, Publisher: IJCAI, https://www.ijcai.org/proceedings/2021/0364.pdf.

* cited by examiner

METHOD AND SYSTEM TO PROCESS ASYNCHRONOUS AND DISTRIBUTED TRAINING TASKS

This U.S. patent application claims priority under 35 U.S.C. § 119 to: Indian Patent Application No. 202221014863, filed on Mar. 17, 2022. The entire contents of the aforementioned application are incorporated herein by reference.

TECHNICAL FIELD

The disclosure herein generally relates to asynchronous training process, and, more particularly, to method and system to process asynchronous and distributed training tasks.

BACKGROUND

Tremendous evolution of deep learning (DL) in various fields increases its use of large-scale data and models with higher accuracy specifically in the areas such as natural language processing and computer vision. Training a large-scale deep neural network (DNN) model with large-scale training data is time-consuming. Traditional Artificial Intelligence (AI) techniques require significant resource requirements rendering modeling efforts infeasible in resource constrained environments for training the model. Deep learning models achieve high accuracy but training them requires huge data and processing resources. Training of deep learning models is typically carried out in a distributed fashion on multiple CPUs and GPUs with various frameworks and mechanisms. To speed up such massive DNN models training parallel distributed training methodology is widely adopted.

Synchronous distributed training in general has good convergence rate across all workers. But synchronization overhead becomes larger as the number of workers and the size of model increase, which degrades the training performance. Several synchronization overhead with more than 70% of entire training requires more workers. Hence, performance issues can be more serious in heterogeneous environments where there are workers with different training speeds. In general, there is a tradeoff between model accuracy and training performance that reduces overhead, but it inevitably results significant difference among local models of workers. However, existing state of the art techniques do not consider the scale of training data training performance while maintaining the degradation of model accuracy.

SUMMARY

Embodiments of the present disclosure present technological improvements as solutions to one or more of the above-mentioned technical problems recognized by the inventors in conventional systems. For example, in one embodiment, a system to process asynchronous and distributed training tasks is provided. The system includes creating a work queue (Q) with a set of predefined number of tasks, where each task comprises of a training data obtained from one or more sources and allocating estimated resources to process the work queue (Q) asynchronously. Further, at least one of a set of central processing units (CPUs) information and a set of graphics processing units (GPUs) information of the current environment are fetched where the task is being processed. Further, using a resource allocator is computed for a number of parallel processes (p) queued on each CPU, and a number of parallel processes (q) queued on each GPU, a number of iterations, and a flag status. Then, a parallel process asynchronously on the work queue (Q) are initiated to train a set of deep learning models with optimized resources by, processing each task by using a data pre-processing technique, to compute a transformed training data based on at least one of the training data, the number of iterations, and the number of parallel processes (p) queued on each CPU. Further, by using an asynchronous model training technique, the set of deep learning models are trained on each GPU asynchronously with the transformed training data based on a set of asynchronous model parameters.

In accordance with an embodiment of the present disclosure, the transformed training data of each task using the data pre-processing technique is computed by performing the steps of obtaining, the training data, the number of iterations, and the number of parallel processes (p) to be queued on each CPU. Further an empty queues are created for the work queue (Q) and an output queue; appending, the work queue (Q) with the training data and a data transformation function based on the number of iterations; creating, (p) parallel processes to be queued to execute the task and scan the work queue (Q); and checking, if the work queue (Q) is not null to process the task, and if the flag status is zero, compute the transformed training data from the data transforming function, and save the transformed training data into a data storage with a unique identifier, if the flag status is non-zero, compute the training data with a user process without decoupling and writing the output data into the output queue, and finally delete the task from the work queue after processing the task.

In accordance with an embodiment of the present disclosure, the set of asynchronous model parameters comprises (i) a selected deep learning model to be trained (ii) the number of iterations, (iii) the transformed training data, (iv) a file path of the transformed training data, and (v) the number of parallel processes (q) queued on GPU, and (vi) a number of available GPUs.

In accordance with an embodiment of the present disclosure, training the set of deep learning models on each GPU with the transformed training data using the asynchronous model training technique comprises: obtaining, the set of asynchronous model parameters and initializing an empty list of processed files and a count of processed files to zeros; and checking, the count of processed files is not equal to the number of iterations and iteratively perform when the number of iterations are processed by, scanning for a new training data file to a specified path based on the flag status and if the new training data file is detected determine the file processing status; iteratively scanning for the new training data files for processing in the writing mode and mark as processed files, and update the new training data file; loading the new training data file with the transformed training data; and training a set of deep learning models on each GPU with parallel processes (q) queued on the GPU with the transformed training data and its corresponding weights and save the set of deep learning models.

In another aspect, a method to process asynchronous and distributed training tasks is provided. The method includes creating a work queue (Q) with a set of predefined number of tasks, where each task comprises of a training data obtained from one or more sources and allocating estimated resources to process the work queue (Q) asynchronously. Further, at least one of a set of central processing units (CPUs) information and a set of graphics processing units (GPUs) information of the current environment are fetched where the task is being processed. Further, using a resource allocator is computed for a number of parallel processes (p) queued on each CPU, and a number of parallel processes (q) queued on each GPU, a number of iterations, and a flag status. Then, a parallel process asynchronously on the work queue (Q) are initiated to train a set of deep learning models with optimized resources by, processing each task by using a data pre-processing technique, to compute a transformed training data based on at least one of the training data, the number of iterations, and the number of parallel processes (p) queued on each CPU. Further, by using an asynchronous model training technique, the set of deep learning models are trained on each GPU asynchronously with the transformed training data based on a set of asynchronous model parameters.

In yet another aspect, a non-transitory computer readable medium for creating a work queue (Q) with a set of predefined number of tasks, where each task comprises of a training data obtained from one or more sources and allocating estimated resources to process the work queue (Q) asynchronously. Further, at least one of a set of central processing units (CPUs) information and a set of graphics processing units (GPUs) information of the current environment are fetched where the task is being processed. Further, using a resource allocator is computed for a number of parallel processes (p) queued on each CPU, and a number of parallel processes (q) queued on each GPU, a number of iterations, and a flag status. Then, a parallel process asynchronously on the work queue (Q) are initiated to train a set of deep learning models with optimized resources by, processing each task by using a data pre-processing technique, to compute a transformed training data based on at least one of the training data, the number of iterations, and the number of parallel processes (p) queued on each CPU. Further, by using an asynchronous model training technique, the set of deep learning models are trained on each GPU asynchronously with the transformed training data based on a set of asynchronous model parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
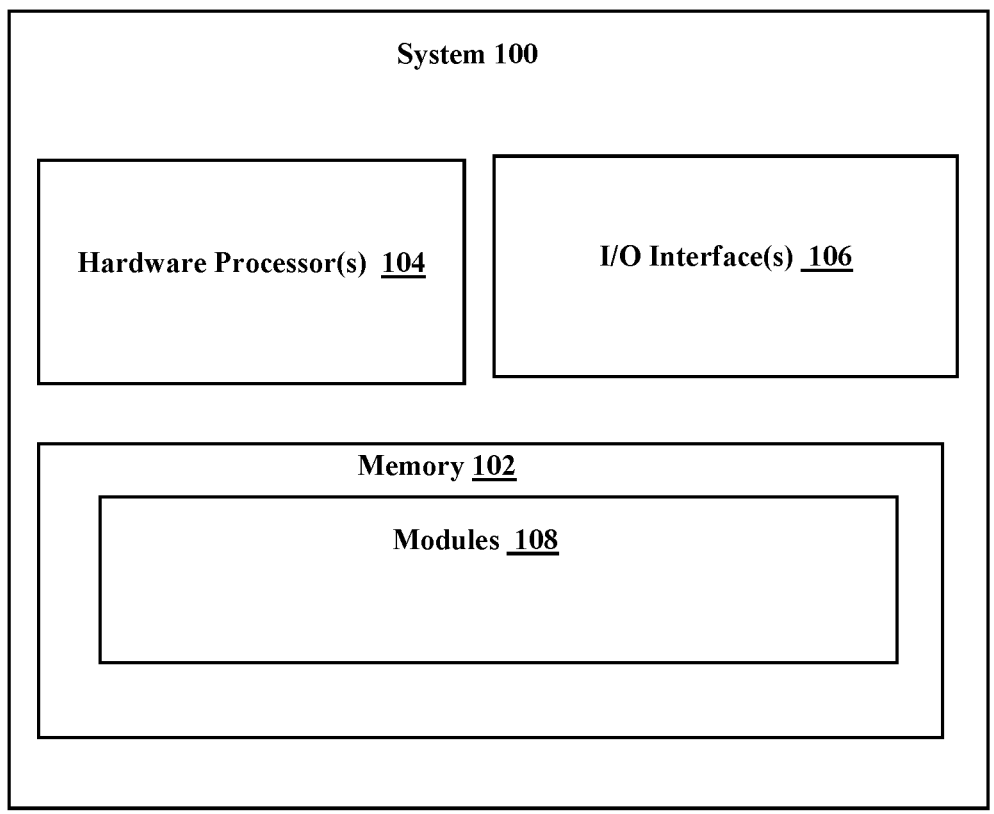
FIG. 1 illustrates an exemplary system for asynchronous and distributed process of training tasks performed in parallel in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for process asynchronous and distributed training tasks. The method disclosed, enables training the training data of deep learning models asynchronously with improved training performance. With increasing scale of models and data, every iteration of parallel distributed training includes computation, data execution and communication. Training a large-scale deep neural network (DNN) model with large-scale data is time-consuming. To speed up the training of massive DNN models, data-parallel distributed training has been widely adopted. In general, synchronous training suffers from synchronization overhead specifically in heterogeneous environments. To reduce the synchronization overhead, asynchronous based training employs asynchronous communication between a data pre-processing module and an asynchronous model training module such that each task is executed independently eliminating waiting time. Conventionally, training the deep learning model involves a data pre-processing phase and an asynchronous model training phase. The method of the present disclosure performs parallel execution of such processes asynchronously distributing simultaneous data pre-processing phase or transformation preceded by training the deep learning models. Such asynchronous approach accelerates training and optimizes resource utilization cost. Also, the system and method of the present disclosure are time efficient, accurate and scalable with employed asynchronous approach. The disclosed system is further explained with the method as described in conjunction with FIG. 1 to FIG. 8 below.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary system for asynchronous and distributed process of training tasks performed in parallel in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
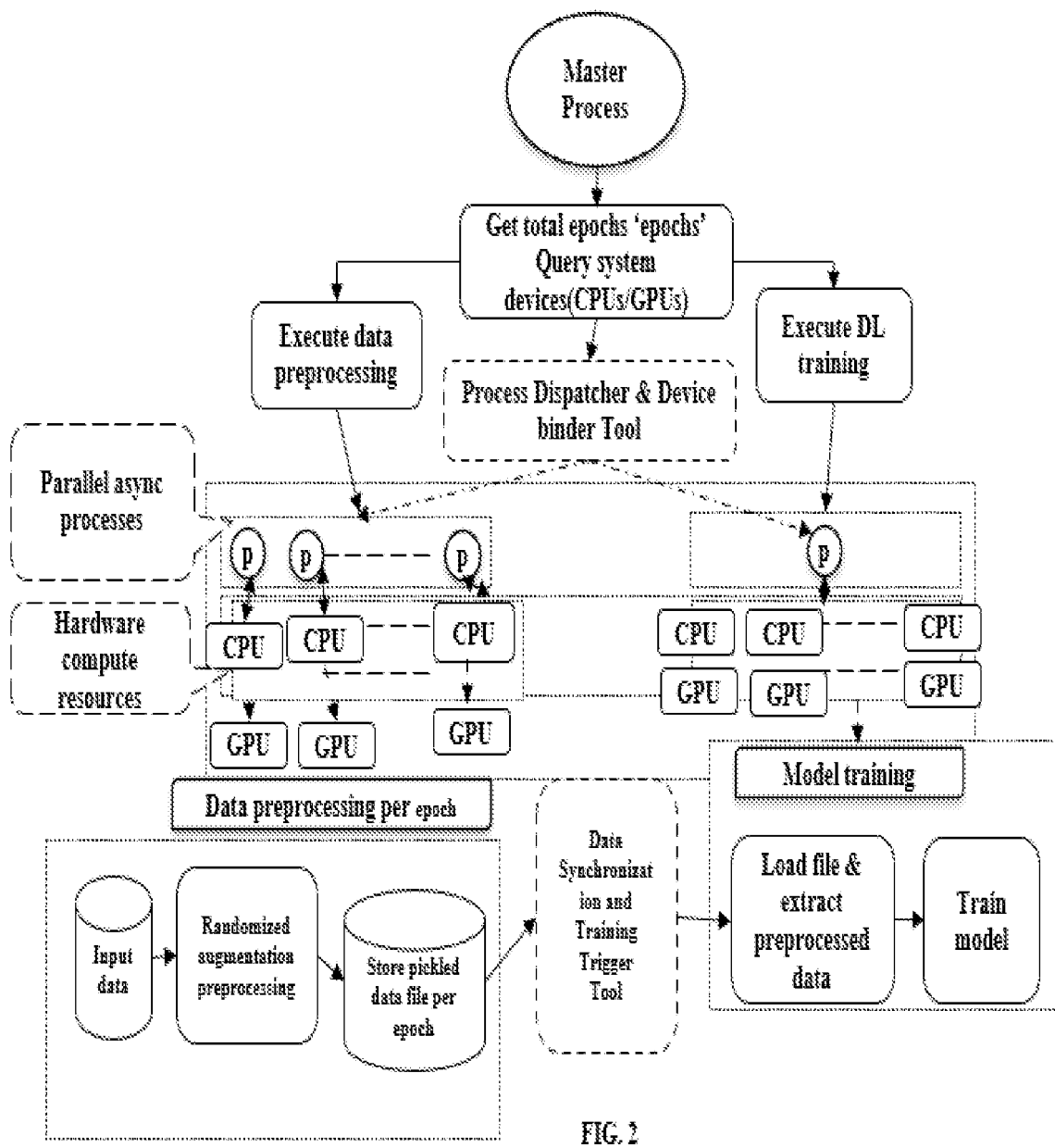
FIG. 2 illustrates an exemplary functional block diagram of the system showing process of asynchronous and distributed training tasks, in accordance with some embodiments of the present disclosure.

FIG. 2 illustrates an exemplary functional block diagram of the system showing process of asynchronous and distributed training tasks, in accordance with some embodiments of the present disclosure. FIG. 2 includes a system 100 comprising a data preprocessing module and an asynchronous model training, where processing of each task in each models are executed parallelly asynchronously based on the number of available resources. Here, a set of graphics processing units (GPUs) and a set of central processing units (CPUs) available in the system process the input data utilizing the data pre-processing module and the asynchronous model training module. Randomized preprocessing computations are executed in parallel which asynchronously overlaps results of computations. Here, one process performs the asynchronous model training on the set of GPUs that gets triggered for next epoch data is available to train the model training. This reduces the GPU waiting time by feeding preprocessed data rapidly resulting on overlapping of preprocessing and training asynchronously.

The method of the present disclosure first decouples the sequential tasks into separate tasks and carries out computation in asynchronous distributed manner which results,
1. Refactoring sequential tasks into a set of decoupled independent tasks.
2. Removes synchronization between the parallel processes such that each processes picks up new tasks of data transformation without waiting for other processes to finish their data transformation tasks. This enables optimal utilization of resources.
3. Removes synchronization between the data transformation module and the asynchronous model training.

Training the tasks by processing the available transformed data without any explicit communication of processed data and synchronization ensures that training process occupies provided resource and so that utilization is maximized. The present disclosure is further explained considering an example, where the system 100 processes a set of training tasks received from the user using the system of FIG. 1 and FIG. 2.

Figure 3:
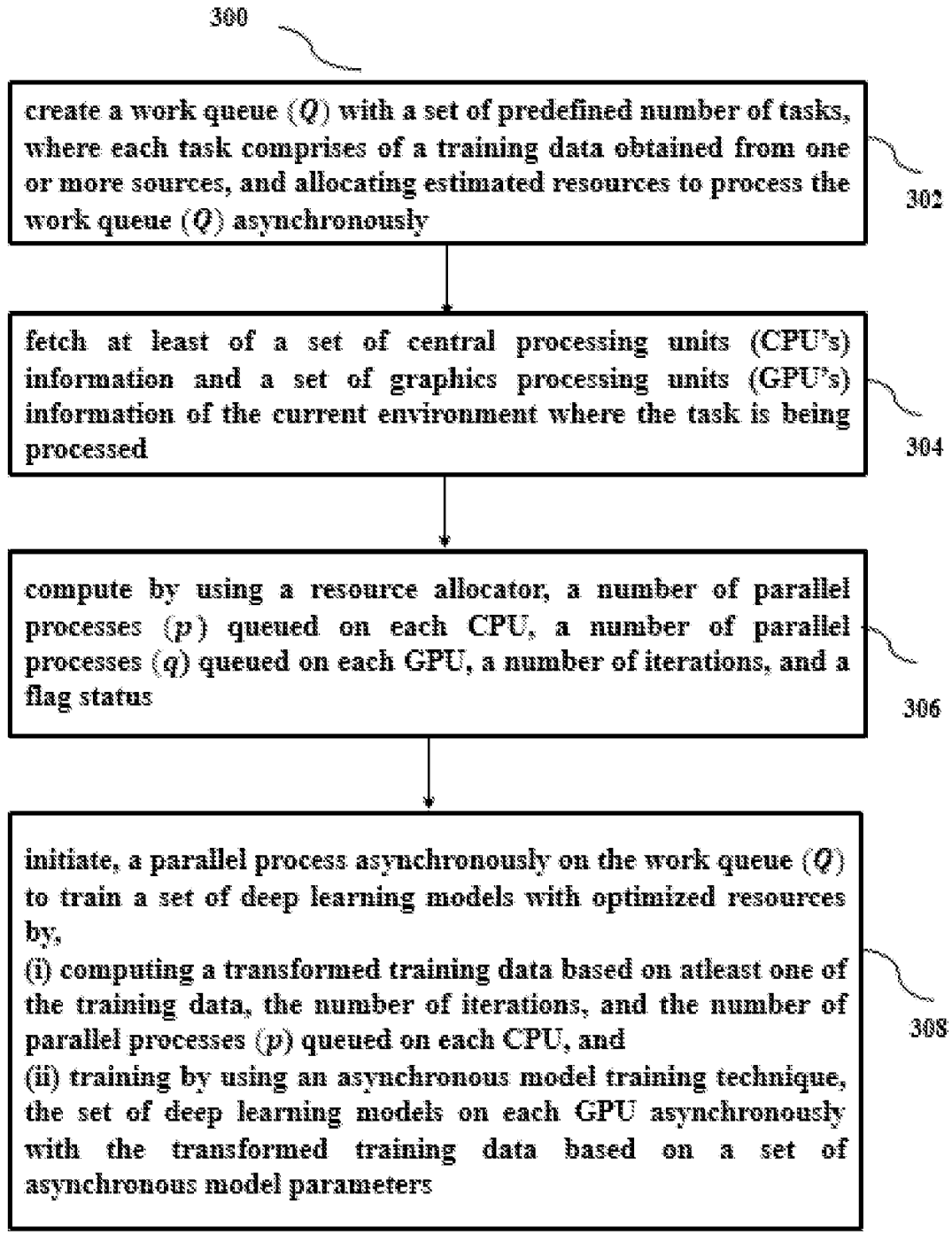
FIG. 3 illustrates a process flow diagram of a method of deep learning models trained in asynchronous mode, in accordance with some embodiments of the present disclosure.

FIG. 3 depicts a flow diagram illustrating a method of deep learning models trained in asynchronous mode, in accordance with some embodiments of the present disclosure. In an embodiment, the live video streaming system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the live video streaming system 100 as depicted in FIG. 2 through FIG. 8. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 create a work queue (Q) with a set of predefined number of tasks, where each task comprises of a training data obtained from one or more sources and allocating estimated resources to process the work queue (Q) asynchronously. Consider an example where the system 100 receives a set of tasks from one or more external sources for training a set of deep learning models. The work queue (Q) is created with a set of predefined number of tasks. Each task is processed from the work queue (Q) where each task includes a training data to train the set of deep learning models. Further, resources are estimated, and the estimated resources are allocated to process each task asynchronously. In one embodiment, the system 100 is decoupled with the data pre-processing module and the asynchronous model training module where each module are executed in parallel to perform each training task. The input sequential tasks are referred as user process function which the system 100 fetches to process by using the data preprocessing preceded by the model training.

Figure 4:
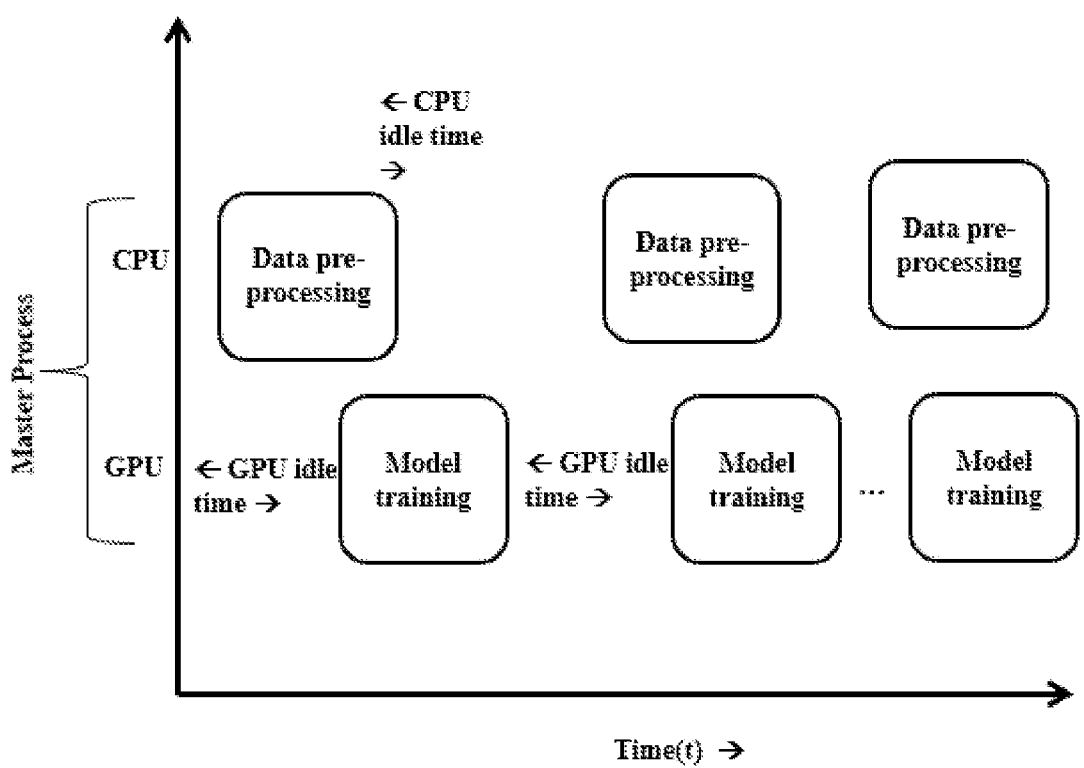
FIG. 4 illustrates a graphical representation of central processing units (CPUs) and graphics processing units (GPUs) plotted with time for sequential training process in deep learning models, in accordance with some embodiments of the present disclosure.

FIG. 4 illustrates a graphical representation of CPUs and GPUs plotted with time for sequential training process in deep learning models, in accordance with some embodiments of the present disclosure. FIG. 4 depicts the training involving multiple tasks like loading data, processing of data involving different data transformations and then finally training model with the processed data. These tasks are sequential in nature and carried out one after other due to dependency on the outcome of previous task. All the distributed training frameworks and mechanism in the state of the art carried out these steps in sequence on different data partitions in parallel or distributed fashion. This distributed computing approach inherently assumes that training steps is the most time consuming in entire processing. However, many computer vision applications involves the data pre-processing and transformations which equally computes intensive and time consuming. These transformation are applied on run-time for augmenting the training data for achieving model robustness. This creates huge imbalance in typical distributed training and results in compute delays at one end and on other end large number of expensive resources are wasted.

Referring back now to the steps of the method 300, at step 304, the one or more hardware processors 104 fetch at least one of a set of central processing units (CPU's) information and a set of graphics processing units (GPUs) information of the current environment where the task is being processed. For the input task the system 100 fetches the information related to the CPUs denoted as ($n_{cpu}$) and the GPUs denoted as ($n_{gpu}$). It is to be noted that randomized process has large processing time with variations represented as ($n_{cpu}$) and ($n_{gpu}$) with number of CPU cores and available GPUs for computations.

Referring now to the steps of the method 300, at step 306, the one or more hardware processors 104 compute by using a resource allocator, a number of parallel processes (p) queued on each CPU, a number of parallel processes (q) queued on each GPU, a number of iterations, and a flag status.

TABLE 1

Asynchronous process training

Data: number of iterations n_iter, user_process( )
Data: flag
Output: Trained model M
$n_{cpu}$, $n_{gpu}$ = fetch_resource_info( );
p, q = resource_allocator (n_iter, M, d_process( ), train( ));
if flag == 0 then
   d_process( ), train( ) = refractor (user_process( ));
   dispatch, run (f1(p, d_process( ));
   dispatch.run (f2 (q, train ( ), M);
end
   dispatch.run (f1(p, user_process( ));
end Referring to the above example, to process the task resource allocator computes the number of parallel process queued on each CPU and the number of parallel processes (q) queued on each GPU as depicted in Table 1.

Figure 6:
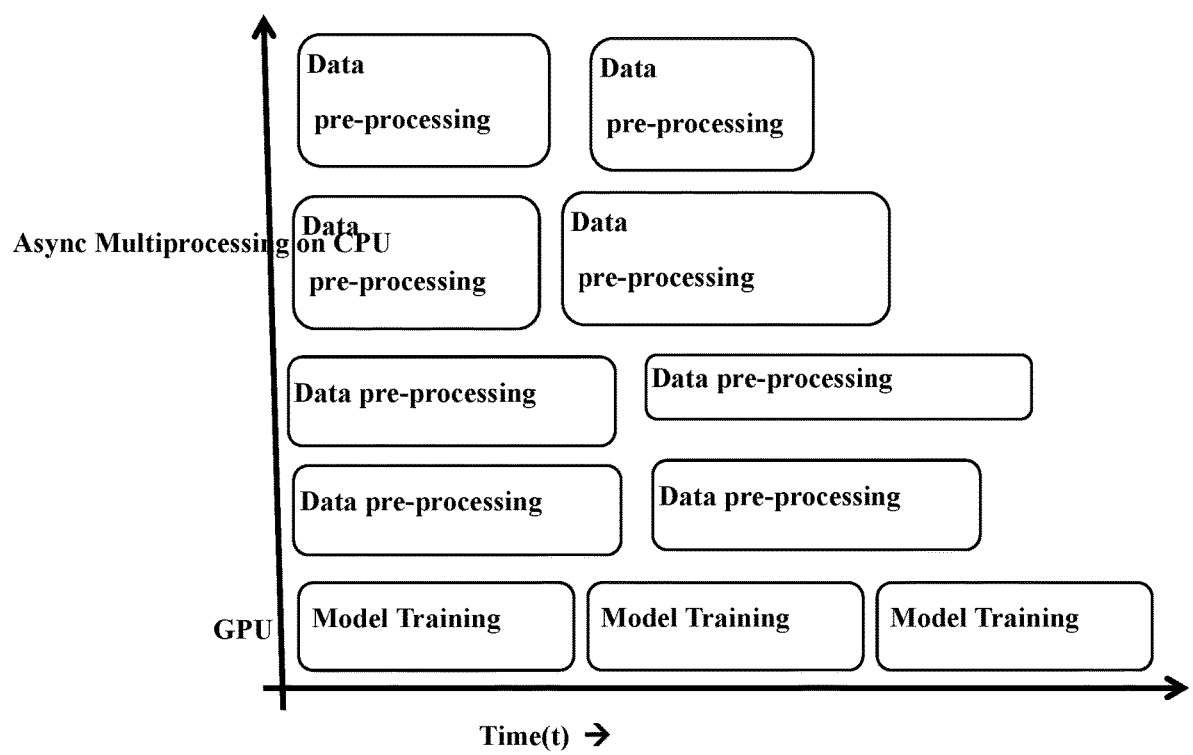
FIG. 6 illustrates a graphical representation of CPUs and GPUs plotted with time for asynchronous and distributed training process in deep learning models, in accordance with some embodiments of the present disclosure.

Referring now to the steps of the method 300, at step 308, the one or more hardware processors 104 initiate a parallel process asynchronously on the work queue (Q) to train a set of deep learning models with optimized resources. Each task is performed asynchronously decoupled with the data pre-processing technique and the asynchronous model training technique. The data pre-processing technique (referring now to FIG. 6) computes a transformed training data based on at least one of the training data, the number of iterations, and the number of parallel processes (p) queued on each CPU. FIG. 6 illustrates a graphical representation of CPUs and GPUs plotted with time for asynchronous and distributed training process in deep learning models.

The data pre-processing technique (Table 2) performs the following steps on each task being performed, Step 1—obtaining a set of parameters comprising the training data, the number of iterations, and the number of parallel processes (p) to be queued on each CPU.

Step 2—creating an empty queues for the work queue (Q) and an output queue.

Step 3—appending the work queue (Q) with the training data and a data transformation function based on the number of iterations.

Step 4—creating (p) parallel processes to be queued to execute the task and scan the work queue (Q).

Step 5—checking if the work queue (Q) is not null to process the task, and
  (a) if the flag status is zero, the transformed training data is computed from the data transforming function, and saving the transformed training data into a data storage with a unique identifier,
  (b) if the flag status is non-zero, the training data is computed with a user process without decoupling and writing the output data into the output queue; (c) delete the task from the work queue after processing the task.

TABLE 2

Data pre-processing technique

Data: Training data D, number of iterations n_iter
Data: Processes p, compute functions d_process( )
Result: D_trans_p
Initialize Q, $Q_{out}$ ← NULL;
for i in range ($n_{iter}$) do
   append Q ← D_p, d_process( );
end
if p < $n_{iter}$ then
   Fork p processes and start scanning Q;
end
else
   Fork $n_{iter}$ processes and start scanning Q;
End
while Q ≠ NULL do
  if flag == 0 then
    compute D_trans_p = d_process (D);
    save D_trans_p with time stamp;
  end
  else
    compute out_p = user_process (D);
    write out_p to Q_out;
  end
  delete (D_p, d_process( )) from Q;
end In one embodiment, the randomized data transformation is computed on the training data D and processed transformed training data (D_trans_p) is generated. Initially, it creates work queue (Q) of the number of iterations (niter) for the transformed training data tasks and launches (☐) parallel asynchronous processes. Each process scans the work queue (Q) and picks up the data transformation tasks while the work queue (Q) is not empty and deletes the task from the work queue (Q). Further, the data pre-processing technique performs computation on the input training data D with the transformation process d_process( ) and writes the output transformed training data (D_trans_p) back to the specified locations with the unique identifier. The process then returns to the work queue (Q) and picks up the next available task. Since each process is independent and has separate process ID, there is no dependency or interaction with any other process. Once all the number of iterations (niter) tasks in the work queue (Q) are completed the data pre-processing technique terminates all the processes and moves to the next processing module.

Figure 7:
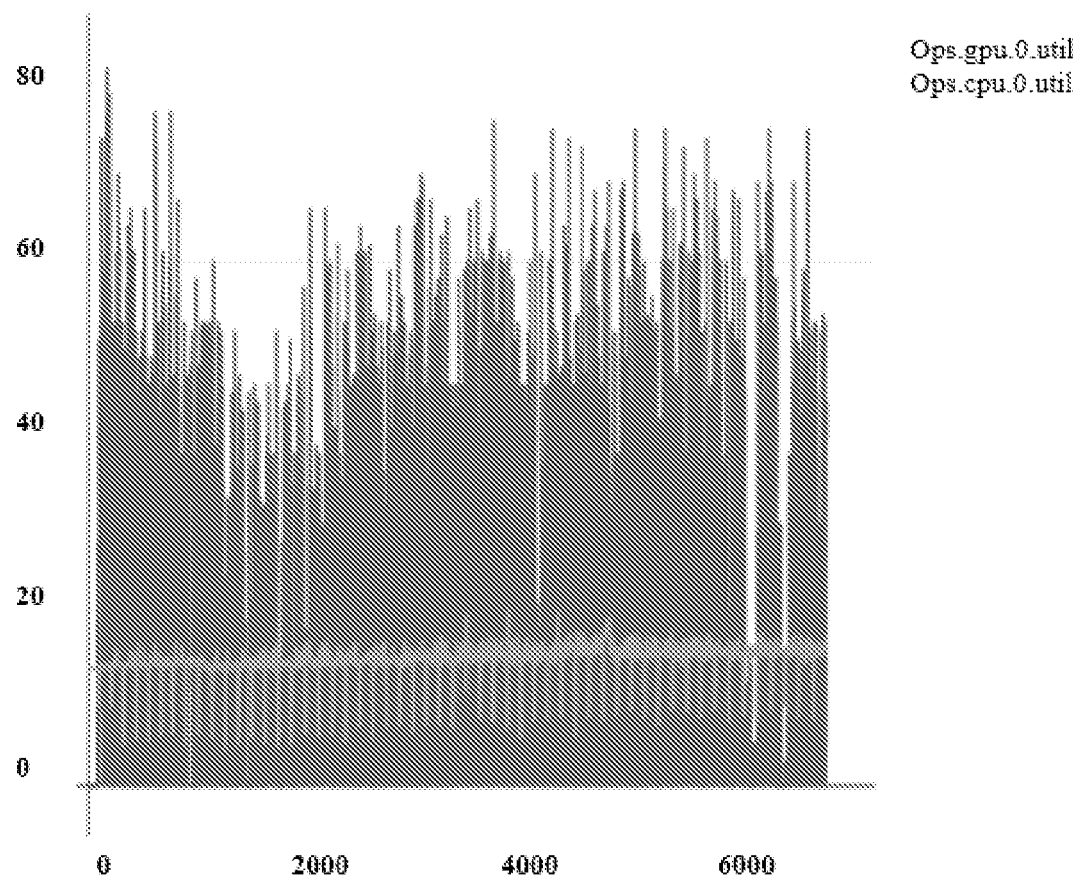
FIG. 7 illustrates experimental results plotted for GPU utilization with asynchronous training process, in accordance with some embodiments of the present disclosure.
Figure 8:
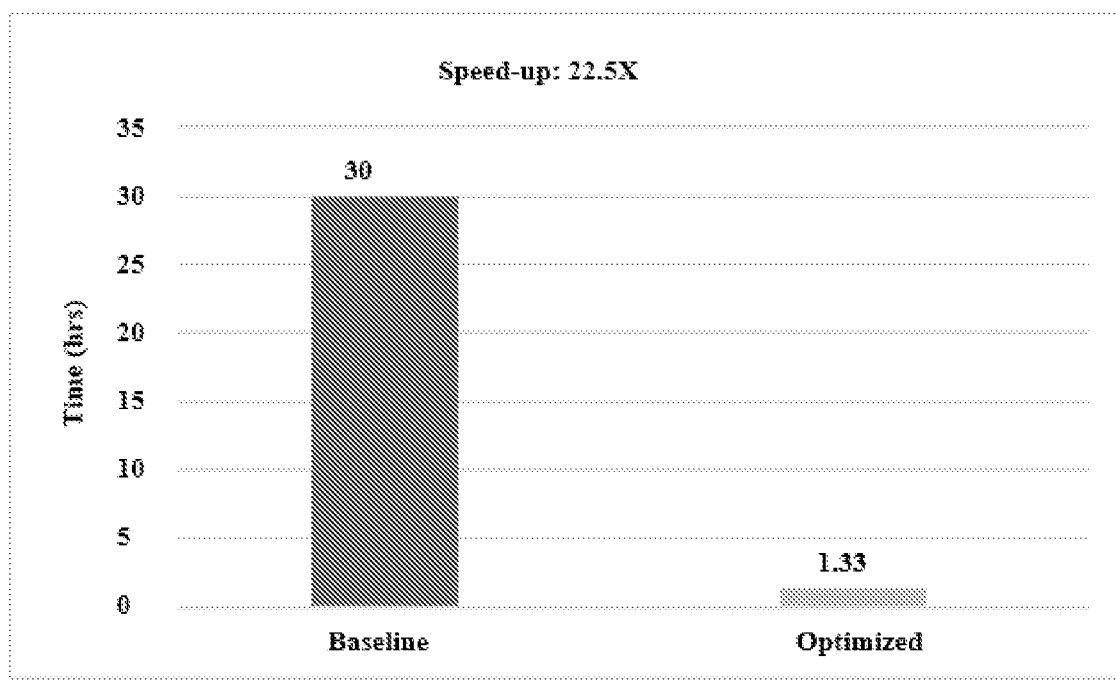
FIG. 8 illustrates experimental results of the performance improvement of optimized asynchronous training process for deep learning models in comparison with baseline models, in accordance with some embodiments of the present disclosure.

The asynchronous model training technique (refer FIG. 7) trains the set of deep learning models on each GPU asynchronously with the transformed training data based on a set of asynchronous model parameters. FIG. 7 illustrates experimental results plotted for GPU utilization with asynchronous training process, input to the asynchronous model training technique is the output obtained from the data pre-processing technique obtained for each task.

The set of asynchronous model parameters comprises of (i) a selected deep learning model to be trained (ii) the number of iterations, (iii) the transformed training data, (iv) a file path of the transformed training data, and (v) the number of parallel processes (q) queued on GPU, and (vi) a number of available GPUs.

The asynchronous model training technique (Table 3) performs the following steps,
- Step 1—obtaining the set of asynchronous model parameters and initializing an empty list of processed files and a count of processed files to zeros.
- Step 2—checking the count of processed files is not equal to the number of iterations and iteratively perform when the number of iterations are processed (FIG. 8) which illustrates experimental results of the performance improvement of optimized asynchronous training process for deep learning models in comparison with baseline models by,
  - (a) scanning for a new training data file to a specified path based on the flag status and if the new training data file is detected determine the file processing status.
  - (b) iteratively scanning for the new training data files for processing in the writing mode and mark as processed files and update the new training data file.
  - (c) loading the new training data file with the transformed training data, and
  - (d) training a set of deep learning models on each GPU with parallel processes (q) queued on the GPU with the transformed training data and its corresponding weights and save the set of deep learning models.

TABLE 3

Asynchronous model training technique

Data : Model M, number of iterations n_iter, D_trans_p, file_path
Data: number of GPUS $n_{gpu}$, compute functions train ( )
Result: Trained model M
Initialize list_proc_files = NULL, $c_n$ = 0;
While $C_n \neq$ niter do
  flag_1 = scan_new_file (file_path);
  flag_2 = is_processed_file (list_proc_files);
  if flag_1 == TRUE and flag_2 == FALSE then
    while is_file_writeMode (file_path) do
      noOPs
    end
    Update list_proc_files;
    Load data D_trans_p = load_file (file_path);
    train (n_gpus, M, D_train_p);
    $C_n \leftarrow C_n + 1$
  end
end
return M In one embodiment the asynchronous model training technique carries out the model training on the $n_{gpu}$. The asynchronous model training technique initializes a list of processed files or data along with their count $C_n$. The asynchronous model training technique scans for the new processed file at the preset location file path. If a new data file is detected, it checks whether the file is ready to process or in write mode. The asynchronous model training technique performs no operations while the new detected file is in write mode. Post completion of the writing, the transformed training data (D_trans_p) is loaded and passed to the training function train( ) The model training is performed on the ($n_{gpu}$) using known distributed strategies of the underlying framework (e.g. Tensor Flow, Horovod, and thereof). The asynchronous model training technique updates the list of processed files and the count $C_n$ after completion of training on the file. This is repeated till all the number of iterations (niter) files are processed.

Figure 5:
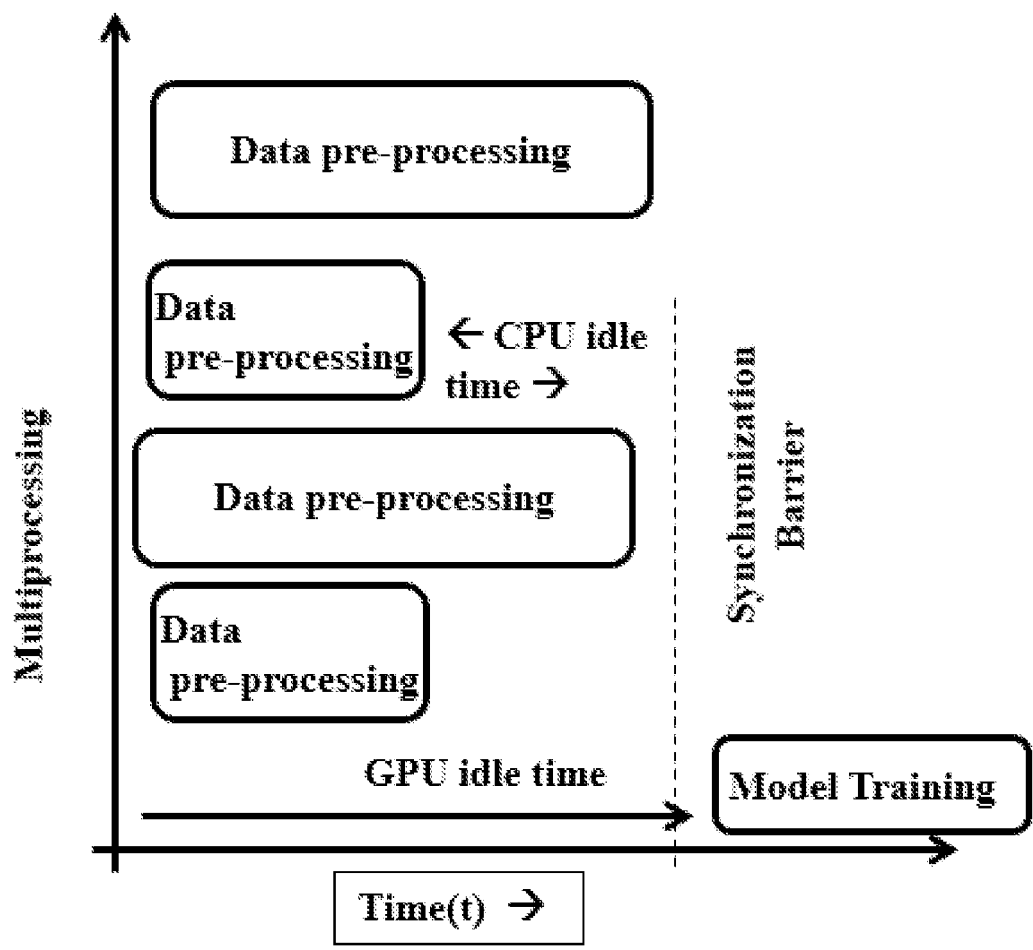
FIG. 5 illustrates a graphical representation of CPUs and GPUs multiprocessing plotted with time for synchronous distributed training processes in deep learning models, in accordance with some embodiments of the present disclosure.

FIG. 5 illustrates a graphical representation of CPUs and GPUs plotted with time for synchronous distributed training processes in deep learning models, in accordance with some embodiments of the present disclosure. The data pre-processing technique and transformations are executed in CPUs while model training awaits for data and GPUs remain in idling state. This imbalance is further aggravated due to randomization of the data processing and transformations, where different set of images are applied different transformations. Each transformation has different processing time for same input. This step is carried out in distributed setup ideally some processes finish the task at hand early while some keeps running for longer time. When all the parallel processes are synchronized and processes which have completed the task shall wait for finishing of the tasks. This results in resource idling and the state of the art techniques with distributed training mechanism in such scenario would end up in wasting expensive compute resources and result in longer model training time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of asynchronous training process. The embodiment, thus provides method and system to process asynchronous and distributed training tasks. Moreover, the embodiments herein further provides asynchronous process of training data with sequential tasks decoupled into independent tasks. This removes synchronization barrier between the parallel processes such that each processes picks up new tasks of data transformation without waiting for other processes to finish their data transformation tasks. This enables optimal utilization of resources. Asynchronous distributed data processing and training model decouples the data transformation and training and utilizes all the available CPU cores and minimizes GPU idling time by overlapping different computations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to process asynchronous and distributed training tasks, the method further comprising:
creating via one or more hardware processors, a work queue (Q) with a set of predefined number of tasks, where each task comprises of a training data obtained from one or more sources, and allocating estimated resources to process the work queue (Q) asynchronously;
fetching via the one or more hardware processors, at least at least one of a set of central processing units (CPUs) information and a set of graphics processing units (GPUs) information of the current environment where the task is being processed;
computing via the one or more hardware processors 104, by using a resource allocator, a number of parallel processes (p) queued on each CPU, a number of parallel processes (q) queued on each GPU, a number of iterations, and a flag status; and
initiating via the one or more hardware processors, a parallel process asynchronously on the work queue (Q) to train a set of deep learning models for resource optimization by,
processing each task by using a data pre-processing technique, to compute a transformed training data based on at least one of the training data, the number of iterations, and the number of parallel processes (p) queued on each CPU; and
training by using an asynchronous model training technique, the set of deep learning models on each GPU asynchronously with the transformed training data based on a set of asynchronous model parameters, wherein training the set of deep learning models on each GPU with the transformed training data using the asynchronous model training technique comprises:
obtaining the set of asynchronous model parameters and initializing an empty list of processed files, and a count of processed files to zeros; and
checking the count of processed files is not equal to the number of iterations and iteratively perform when the number of iterations are processed by,
scanning for a new training data file to a specified path based on the flag status and if the new training data file is detected determine the file processing status;
iteratively scanning for the new training data files for processing in the writing mode and mark as processed files, and update the new training data file;
loading the new training data file with the transformed training data; and
training a set of deep learning models on each GPU with parallel processes (q) queued on the GPU with the transformed training data and its corresponding weights and save the set of deep learning models.

2. The processor implemented method as claimed in claim 1, wherein computing the transformed training data of each task using the data pre-processing technique comprises:
obtaining the training data, the number of iterations, and the number of parallel processes (p) to be queued on each CPU;
creating an empty queues for the work queue (Q) and an output queue;
appending the work queue (Q) with the training data and a data transformation function based on the number of iterations;
creating (p) parallel processes to be queued to execute the task and scan the work queue (Q); and
checking if the work queue (Q) is not null to process the task, and
if the flag status is zero, compute the transformed training data from the data transforming function, and save the transformed training data into a data storage with a unique identifier, if the flag status is non-zero, compute the training data with a user process without decoupling and writing the output data into the output queue, and delete the task from the work queue after processing the task.

3. The processor implemented method as claimed in claim 1, wherein the set of asynchronous model parameters comprises (i) a selected deep learning model to be trained (ii) the number of iterations, (iii) the transformed training data, (iv) a file path of the transformed training data, and (v) the number of parallel processes (q) queued on GPU, and (vi) a number of available GPUs.

4. A system to process asynchronous and distributed training tasks, further comprising:

a memory storing instructions;

one or more communication interfaces; and one or more hardware processors coupled to the memory via the one or more communication interfaces, wherein the one or more hardware processors are configured by the instructions to:

create a work queue (Q) with a set of predefined number of tasks, where each task comprises of a training data obtained from one or more sources, and allocating estimated resources to process the work queue (Q) asynchronously;

fetch at least one of a set of central processing units (CPUs) information and a set of graphics processing units (GPUs) information of the current environment where the task is being processed;

compute by using a resource allocator, a number of parallel processes (p) queued on each CPU, a number of parallel processes (q) queued on each GPU, a number of iterations, and a flag status; and initiate a parallel process asynchronously on the work queue (Q) to train a set of deep learning models with optimized resources by, processing each task by using a data pre-processing technique, to compute a transformed training data based on at least one of the training data, the number of iterations, and the number of parallel processes (p) queued on each CPU; and training by using an asynchronous model training technique, the set of deep learning models on each GPU asynchronously with the transformed training data based on a set of asynchronous model parameters, wherein training the set of deep learning models on each GPU with the transformed training data using the asynchronous model training technique comprises:

obtain the set of asynchronous model parameters and initializing an empty list of processed files, and a count of processed files to zeros; and check the count of processed files is not equal to the number of iterations and iteratively perform when the number of iterations are processed by, scan for a new training data file to a specified path based on the flag status and if the new training data file is detected determine the file processing status;

iteratively scan for the new training data files for processing in the writing mode and mark as processed files, and update the new training data file;

load the new training data file with the transformed training data; and train a set of deep learning models on each GPU with parallel processes (q) queued on the GPU with the transformed training data and its corresponding weights and save the set of deep learning models.

5. The system of claim 4, wherein computing the transformed training data of each task using the data pre-processing technique comprises:

obtain the training data, the number of iterations, and the number of parallel processes (p) to be queued on each CPU;

create an empty queues for the work queue (Q) and an output queue;

append, the work queue (Q) with the training data and a data transformation function based on the number of iterations;

create (p) parallel processes to be queued to execute the task and scan the work queue (Q); and check if the work queue (Q) is not null to process the task, and if the flag status is zero, compute the transformed training data from the data transforming function, and save the transformed training data into a data storage with a unique identifier, if the flag status is non-zero, compute the training data with a user process without decoupling and writing the output data into the output queue, delete the task from the work queue after processing the task.

6. The system of claim 4, wherein the set of asynchronous model parameters comprises (i) a selected deep learning model to be trained (ii) the number of iterations, (iii) the transformed training data, (iv) a file path of the transformed training data, and (v) the number of parallel processes (q) queued on GPU, and (vi) a number of available GPUs.

7. One or more non-transitory machine-readable information storage mediums comprising one or more instructions which when executed by one or more hardware processors cause:

creating a work queue (Q) with a set of predefined number of tasks, where each task comprises of a training data obtained from one or more sources, and allocating estimated resources to process the work queue (Q) asynchronously;

fetching at least one of a set of central processing units (CPUs) information and a set of graphics processing units (GPUs) information of the current environment where the task is being processed;

computing by using a resource allocator, a number of parallel processes (p) queued on each CPU, a number of parallel processes (q) queued on each GPU, a number of iterations, and a flag status; and initiating, a parallel process asynchronously on the work queue (Q) to train a set of deep learning models for resource optimization by, processing each task by using a data pre-processing technique, to compute a transformed training data based on at least one of the training data, the number of iterations, and the number of parallel processes (p) queued on each CPU; and training by using an asynchronous model training technique, the set of deep learning models on each GPU asynchronously with the transformed training data based on a set of asynchronous model parameters, wherein training the set of deep learning models on each GPU with the transformed training data using the asynchronous model training technique comprises:

obtaining the set of asynchronous model parameters and initializing an empty list of processed files, and a count of processed files to zeros; and checking the count of processed files is not equal to the number of iterations and iteratively perform when the number of iterations are processed by, scanning for a new training data file to a specified path based on the flag status and if the new training data file is detected determine the file processing status;

iteratively scanning for the new training data files for processing in the writing mode and mark as processed files, and update the new training data file;

loading the new training data file with the transformed training data; and training, a set of deep learning models on each GPU with parallel processes (q) queued on the GPU with the transformed training data and its corresponding weights and save the set of deep learning models.

8. The one or more non-transitory machine-readable information storage mediums of claim 7, wherein computing the transformed training data of each task using the data pre-processing technique comprises:

obtaining the training data, the number of iterations, and the number of parallel processes (p) to be queued on each CPU;

creating an empty queues for the work queue (Q) and an output queue; appending, the work queue (Q) with the training data and a data transformation function based on the number of iterations;

creating (p) parallel processes to be queued to execute the task and scan the work queue (Q); and checking if the work queue (Q) is not null to process the task, and if the flag status is zero, compute the transformed training data from the data transforming function, and save the transformed training data into a data storage with a unique identifier, if the flag status is non-zero, compute the training data with a user process without decoupling and writing the output data into the output queue, and delete the task from the work queue after processing the task.

9. The one or more non-transitory machine-readable information storage mediums of claim 7, wherein the set of asynchronous model parameters comprises (i) a selected deep learning model to be trained (ii) the number of iterations, (iii) the transformed training data, (iv) a file path of the transformed training data, and (v) the number of parallel processes (q) queued on GPU, and (vi) a number of available GPUs.

* * * * *